E. M. McMAHON & F. W. ACKERMAN.
TRAIN DESPATCHING SYSTEM.
APPLICATION FILED MAY 29, 1915.

1,294,928.

Patented Feb. 18, 1919.
5 SHEETS—SHEET 2.

Witnesses
Inventors
E. M. McMahon
and F. W. Ackerman
by Foster Freeman Watson Hart
Attorneys

E. M. McMAHON & F. W. ACKERMAN.
TRAIN DESPATCHING SYSTEM.
APPLICATION FILED MAY 29, 1915.

1,294,928.

Patented Feb. 18, 1919.
5 SHEETS—SHEET 3.

UNITED STATES PATENT OFFICE.

EDWARD M. McMAHON AND FRANK W. ACKERMAN, OF ELMIRA, NEW YORK.

TRAIN-DESPATCHING SYSTEM.

1,294,928.  Specification of Letters Patent.  Patented Feb. 18, 1919.

Application filed May 29, 1915. Serial No. 31,194.

*To all whom it may concern:*

Be it known that we, EDWARD M. MCMAHON and FRANK W. ACKERMAN, citizens of the United States, and residents of Elmira, county of Chemung, State of New York, have invented certain new and useful Improvements in Train-Despatching Systems, of which the following is a specification.

This invention relates to railway electric signaling systems and more particularly to a train despatching system.

Heretofore it has been the practice for the despatcher having a number of way stations under him to call any desired one of those way stations on the telephone and communicate the instructions for the setting of the signals to the way station operator who personally attends to the setting of the signals. When the way station operator is away it is, of course, impossible for the despatcher to reach him and therefore the signal under the control of that way station operator cannot be set. The principal object of this invention is therefore to provide mechanism whereby the train despatcher may select and operate any one of a plurality of signals along the railway line directly from his headquarters. The arrangement we provide is such that any one of a plurality of signals may be selected and operated and its exact condition will be known at the despatcher's station by means of indicating devices which are associated with a part of the impulse transmitting mechanism.

Another object of the invention is to provide a simple and efficient device which may be included in standard signal circuits in use on many roads, and so constructed that the insertion may be effected practically without any change in the apparatus in use.

Another object is to provide a mechanism which will not interfere with the communication by telephone between the despatcher's station and the way stations. The above and other objects and the novel features of the invention will be apparent from the following description taken in connection with the drawings in which—

Figure 1 is a diagram of a system embodying our invention;

Fig. 1ª illustrates a slight modification;

Figures 1, 1A:
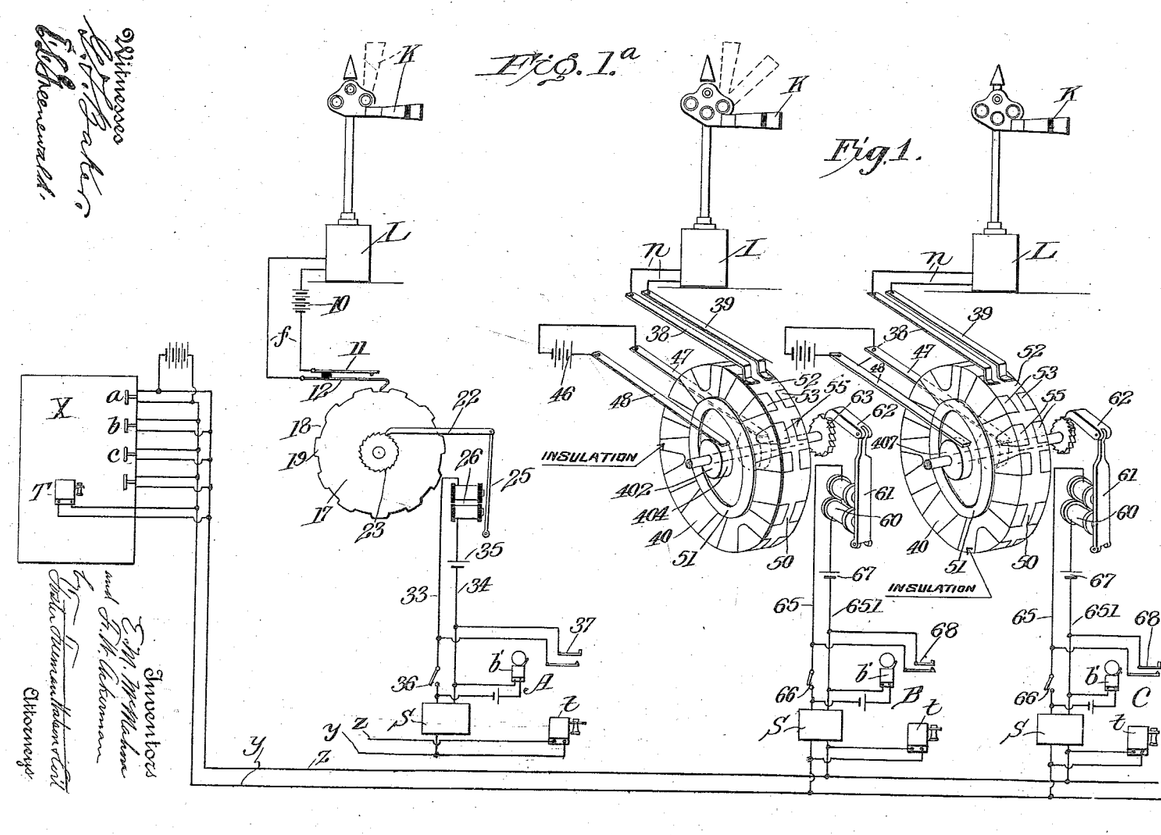
Figure 2:
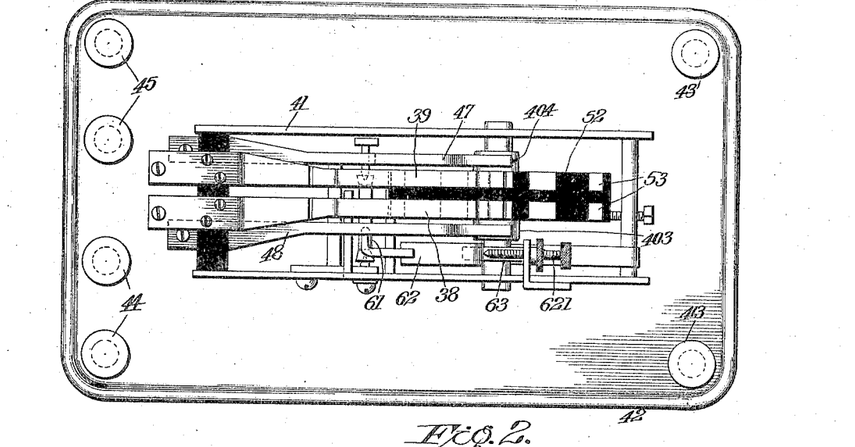
Fig. 2 is a plan view.
Figure 3:
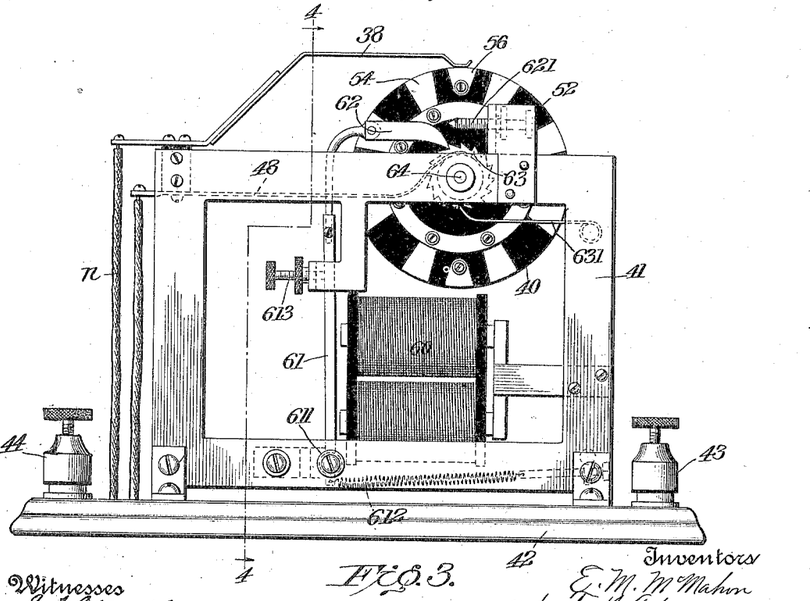
Fig. 3 is a side elevation of a controlling device made according to our invention;
Figure 4:
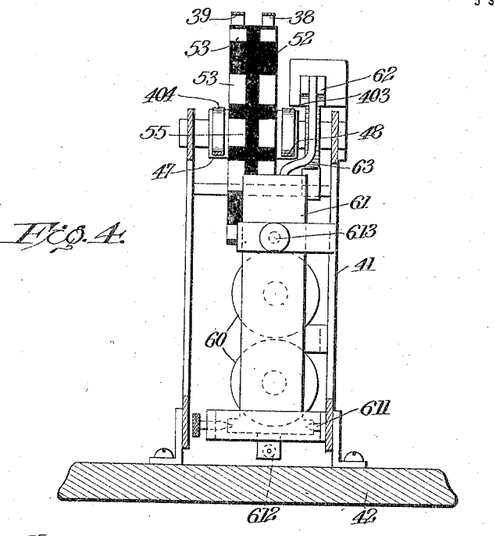
Fig. 4 is a vertical transverse section of the control device taken along the line 4—4 of Fig. 3.

Referring to the drawing, X diagrammatically represents a train despatcher's control station in which are located a series of keys or impulse sending devices $a$, $b$, $c$, etc., which are all multipled to the telephone circuit $y$, $z$ which leads to the way stations A, B, C, etc., along the railway. The despatcher's station is equipped with a telephone set T which is connected to the telephone circuit $y$, $z$ and each of the stations A, B, C, etc., has a telephone set $t$ which is connected to the telephone circuit $y$, $z$, in the usual manner.

Each way station is also provided with a telephone or sub-station selecting mechanism $s$ which is provided with the usual relays for operating it in response to impulses received from the despatcher's station. The selectors $s$ at the respective way stations are each connected with a circuit including a bell $b$ and when any particular way station is called the bell of that station is vibrated. Thus with a single telephone line any one of a plurality of way stations may be selected by the despatcher at the control station to bring the way station operator into communication with the despatcher.

At each way station there is a signal, either an electrically operated semaphore in a separate tower or a light displayed on the station itself, each of which is capable of presenting at least two different aspects. In the diagram associated with the way station

A (Fig. 1ª) we have shown a two-position semaphore signal or train order board which may be set either at "90" or at "danger". It is not necessary to describe in detail the electric mechanism which raises the semaphore arm K. It is sufficient to say that the arm K is lowered by gravity operated devices and is raised by electrically operated devices of any ordinary or preferred description such as are usually located in the base L of the semaphore tower. The electric devices in the base L of the semaphore tower are included in a control circuit comprising wires f, one of which includes a battery 10 and both of which are connected to the contact springs 11 and 12.

Figure 7:
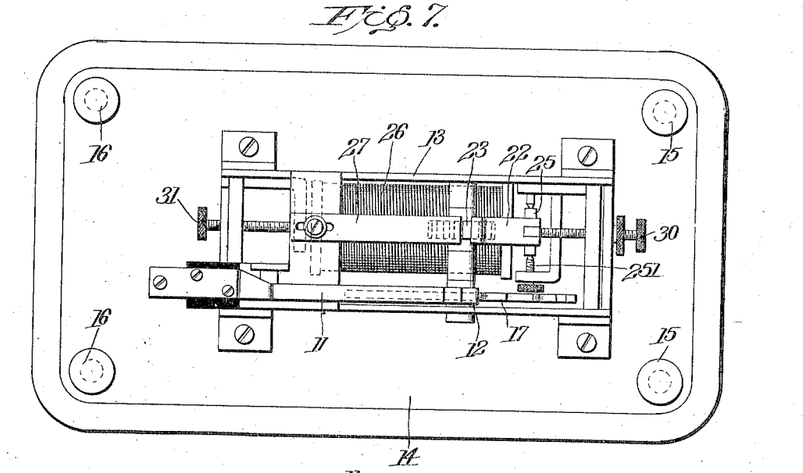
Fig. 7 is a plan view.
Figure 8:
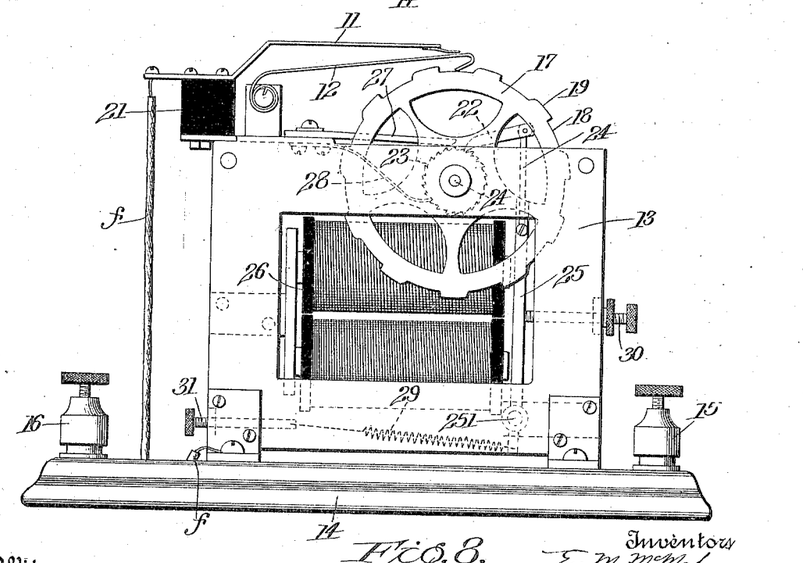
Fig. 8 is a side elevation of another signal control device embodying our invention.
Figure 10:
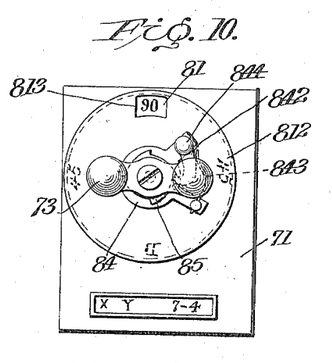
Figs. 10, 11 and 12 are respectively front, side and rear elevations of the impulse sending device at the control station;

Whenever the contract springs 11 and 12 are closed the circuit will be completed through the battery 10 and the electric mechanism in the base L will operate to raise the arm K and upon opening the circuit the arm is automatically restored by gravity. The mechanism for closing the contact springs is shown in Figs. 7 and 8 and consists of a frame 13 mounted on a suitable base 14 to which the pairs of binding posts 15 and 16 are secured. Mounted in the frame between the side members thereof is an intermittently rotatable wheel 17, the peripheral edge of which is provided with notches 18 and projections 19 alternately arranged thereon. The free end of the spring 12 is raised into contact with the free end of the spring 11 when the same is engaged by the projections 19 and the circuit is opened between the springs when the free end of the spring 12 drops in the notches 18. This arrangement provides for alternately opening and closing the circuit between the springs 11 and 12. One branch of the circuit is grounded on the frame 13 to which the spring 12 is connected and the spring 11 is insulated from the frame by means of the block of insulation 21.

The mechanism for intermittently rotating the wheel 17 one step at a time consists of a pawl 22 which engages a ratchet 23 rigidly secured to the shaft 24 upon which the wheel 17 is mounted. The pawl 22 is pivoted to the upper end of a rod 24ª mounted on the armature 25 of the relay magnet 26 consisting of two coils mounted in the frame 13. When the relay magnet 26 is energized the armature 25 thereof is pulled toward it and the wheel 17 is rotated one step. The movement of the pawl 22 is limited by a plate 27 mounted on the frame and the reverse movement of the ratchet 23 is limited by a spring plate 28 also mounted on the frame and having its free end engaging the ratchet teeth of the ratchet 23. The free end of the plate 27 is located so that the pawl movement is limited to exactly one step. When the magnet 26 is deënergized the spring 29 fastened at one end to the lower end of the armature 25 below its pivot 251 and at the other end to the frame, restores the armature 25 to its normal position, whereupon the pawl 22 drops into a succeeding tooth on the ratchet 23 in position to give the wheel 17 another step forward. An adjustable screw 30 mounted in the frame 13 limits the return of the armature 25 to a position where it will be acted upon by the magnet 26 to give it the proper throw. The screw 31 is mounted in the frame 13 and adjusts the tension of the spring 29.

The binding posts 15 are connected to the terminals of the magnet 26 and by circuit wires 33 and 34 they are connected to the bell terminals of the selector s. A battery 35 is included in circuit with the wire 34 and a switch 36 is included in circuit with the wire 33, the latter being provided to cut out the connection of the signal circuit with the selector s. A key 37 is connected to the wires 33 and 34 and is accessible to the way station operator so that the magnet 26 and the signal mechanism can be controlled by the way station operator. Usually the circuit of the magnet 26 will be permanently connected to the selector s so that the despatcher at the control station may have direct control of the signal at all times. At the same time, he may call the way station agent to communicate with him by telephone and give orders for the train crew or he can instruct the agent to set the signal from the way station, if desired.

Associated with the stations B and C (shown in Fig. 1) there is illustrated a three-position semaphore signal arm or train order board K which may be electrically moved by the usual electrical operating mechanism in the base L of the semaphore tower. The arm K may be moved from "danger" to "45" and then to "90", and returning from "90" to "45" to "danger," these positions or different aspects being reached successively by the arm since the operating mechanism of the latter is so arranged that the arm is stepped from one position to the other. When it reaches either the "90" or "danger", it only takes one step to move the arm to the intermediate "45" position. The control circuit for the electric arm moving mechanism in the base L consists of the wires n which are connected to springs 38 and 39, the free ends of which rest on the peripheral surface of an intermittently rotatable wheel 40.

The intermittently rotatable wheel 40 consists of a block of insulating material having the co-axial hubs 401 and 402 on opposite sides thereof. The wheel 40 is rotatably supported in the frames 41, see Figs. 2 to 6, which is mounted on the base 42, provided with a pair of binding screws 43 at one end and two pairs of binding posts 44 and 45 at the opposite ends. The peripheral face of the hubs 401 and 402 are covered by the brass rings 403 and 404 which constitute commutators to lead current to the wheel 40 from the battery 46. The terminals of the battery 46 are connected to springs 47 and 48 mounted on and insulated from the frame 41 and the free ends of which rest on the rings 403 and 404 respectively.

The wheel 40 has the annular plates 50 and 51 mounted in the opposite side faces thereof, which plates are respectively connected to the rings 403 and 404 by suitable conductors. The peripheral surface of the wheel 40 is provided with a series of groups of pairs of contacts separated by insulating surfaces 52. Each group of contacts consists of three pairs of contacts, the pairs on opposite sides of the center pair of contacts representing the "45" position of the semaphore arm. These contacts each consist of a narrow portion 53 on the peripheral surface of the wheel and the right angle flange portion 54 which fits along the side of the wheel and is secured to one of the rings 50 or 51. The center contacts of the group each consist of a portion 55 fitting the periphery of the wheel and a portion 56 extending down the side of the wheel, but terminating short of the conducting rings on the side of the wheel. The ends of the portions 56 are connected to the conducting rings on the opposite face from which they are located by wires 561 which extend through the wheel from face to face as will be seen from an inspection of Figs. 5 and 6. The springs 38 and 39 are mounted on and insulated from the frame 41 and their free ends rest on the peripheral surface of the wheel being spaced apart so that they will simultaneously and successively contact with each pair of contacts or simultaneously rest on the insulating surfaces 52. The groups of metal contacts together with the insulating parts adjacent them provide groups of rests by means of which the circuit connection to the two-wire control circuit n is made, broken or reversed, thereby providing three different circuit conditions in the two-wire control circuit n.

The normal position of the semaphore arm K is at "danger" but may also be at "90" or clear and when the circuit is opened the signal operating mechanism is designed to restore the semaphore arm K to such normal position. Therefore, when the ends of the springs 38 and 39 rest on the insulating spaces 52 between any two of the groups of contacts of the wheel 40 the circuit between the battery 46 and the signal operating mechanism is opened and the semaphore arm K is positioned at "danger." A movement in either direction from "danger" brings the springs 38 and 39 to rest on a pair of contacts 53 by means of which current from the battery 46 is led to the electric signal operating mechanism in the base L to set the semaphore arm K to "45" or "caution" position. The intermediate contacts 55 being connected to opposite sides of the battery from those to which the contacts 53 are connected serve to reverse the current in the circuit wires n so that the current will flow in an opposite direction and thereby move the semaphore arm K into the "90" position when the springs 38 and 39 come into contact with the contacts 55.

The successive positions of the semaphore arm K are reached by stepping the wheel 40 until the desired contacts are moved into engagement with the springs 38 and 39. The mechanism for stepping the wheel one step at a time consists of a relay magnet 60 which operates an armature 61 pivoted at 611 in the frame 41. At the upper end of the armature 61 there is pivotally mounted a pawl 62 the free end of which engages the teeth of a ratchet wheel 63 fixed to turn with the shaft 64 of the commutator wheel 40. When the magnet 60 is energized its armature is drawn up and the pawl 62 is reciprocated so as to turn the ratchet 63 and the wheel 40 one step in a clockwise direction. The stroke of the pawl 62 is limited by an adjustable stop pin 621 mounted in the frame 41. The ratchet 63 is locked against movement in a counterclockwise direction by a spring 631, one end of which is secured to the frame 41 and the free end of which engages the teeth of the ratchet 62. When the magnet 60 is de-energized the armature 61 is pulled back by a spring 612 fastened at one end to the armature 61 below the pivot 611 and adjustably fastened to the frame at its opposite end. The adjustable screw 613 mounted in the frame 41 limits the backward movement of the armature 61 and controls the stroke of the pawl 62.

The circuit wires 65, 651 connect the magnet 60 to the ringing terminals of the selector s, the switch 66 and the battery 67 also being included in the circuit wires 65 and 651 respectively. In order that the station operator may actuate the wheel 40 and change the position of the signal from the way station a key 68 is provided by means of which the relay 60 may be energized. However, it is preferable to leave the switch 66 closed so that the despatcher at the control station may by operating the impulse sending device b select the way station B and change the position of the signal directly from the despatcher's station.

The mechanism for transmitting the impulses is of a well known form designed to send out a combination of current impulses over the line y, z to which some particular selector responds. The selector responding is designed to cause the vibration of a bell b' or some other signal at the way station and the agent at that station then knows that the despatcher wishes to communicate with him over the telephone. When however the switch 66 is closed, as is the normal condition when there is no agent at a semaphore station, or when the agent of any way station is not at his post, actuation of any selector from the despatcher's station will effect energization of the associated magnet 60, and, consequent movement of the semaphore controlled thereby.

The impulse transmitter comprises generally a clock-work mechanism consisting of a main spindle 70 mounted in front and rear plates 71 and 72, carrying at its extreme front end a handle or key 73 and at its extreme rear end is provided with a catch device 74, both fixed on the spindle. The plates 71 and 72 are connected together by suitable rods 711 to form a frame for the mechanism. A main spring 75 is connected at one end to one of the rods 711 and its opposite end is connected to the main spindle 70 so that this spring may be wound up by a turn of the handle 73 to actuate the wheel 76, upon which the proper combination is set. The wheel 76 is fixed on a secondary spindle 761 and has notches 77 and smooth portions 78 which, when the wheel 76 rotates, successively permit separation of and cause contact between the springs 79 and 80 mounted on and insulated from the rear plate 72. The spindle 70 is connected to the spindle 761 by suitable gearing and when the spindle 70 is turned a quarter turn, or until the plate 74 engages the stop pin 741 projecting from the face of the plate 72, the shaft 761 and the wheel 76 thereon will be rotated by the stored energy in the main spring 75. The pawl and the ratchet devices 702 and 703 are a part of the mechanism by means of which the main spring 75 is wound up and when the spindle 70 is turned the ratchet 703 turns therewith and its engagement by the pawl 702 clutches the parts together. The impulse sending mechanism thus far described is not a part of this invention and is of well known construction. The despatcher when sending the impulses over the telephone circuit to operate the signal must know at a glance the exact condition of the signal at any particular station. In order to indicate the condition of the train order board associated with any impulse sending key a plate 81 is provided which is mounted on a hub 811 and at points on its front face spaced apart a distance of 90° are marked the different positions which the arm K of the signal assumes. In the construction of the signal shown at the stations B, C, (Fig. 1), three positions of the arm are possible which are respectively the "danger" position, the "45" position and the "90" position. It will be seen that the "45" position on the dial 81 is the next position beyond either the "90" position or the "danger" position, and therefore can be reached by one movement of the key 73 from either one of these positions. When a two-position signal such as is shown at the station A in Fig. 1ª is used the "danger" indication will be replaced by another "90" position and the "danger" marks placed where the "45" marks are located on the three-position dial and consequently, a quarter turn of the key will cause movement of the arm of a two-position signal from one position to the other. The plate 81 is located behind a casing 812 provided with an opening 813 at the top to expose only that indication of the plate at which the signal is set.

The inner end of the hub 811 of the plate 81 has ratchet teeth 814 thereon, which are engaged by the free end of a spring 815 which spring is mounted on the front face of the plate 71. This prevents the rotation of the indicating wheel 81 with the key 73 in one direction, while the spring 75 is being wound, but permits the plate 81 to rotate with the key when the spindle 70 is rotated by the spring 75.

Figures 11, 12, 14, 15:
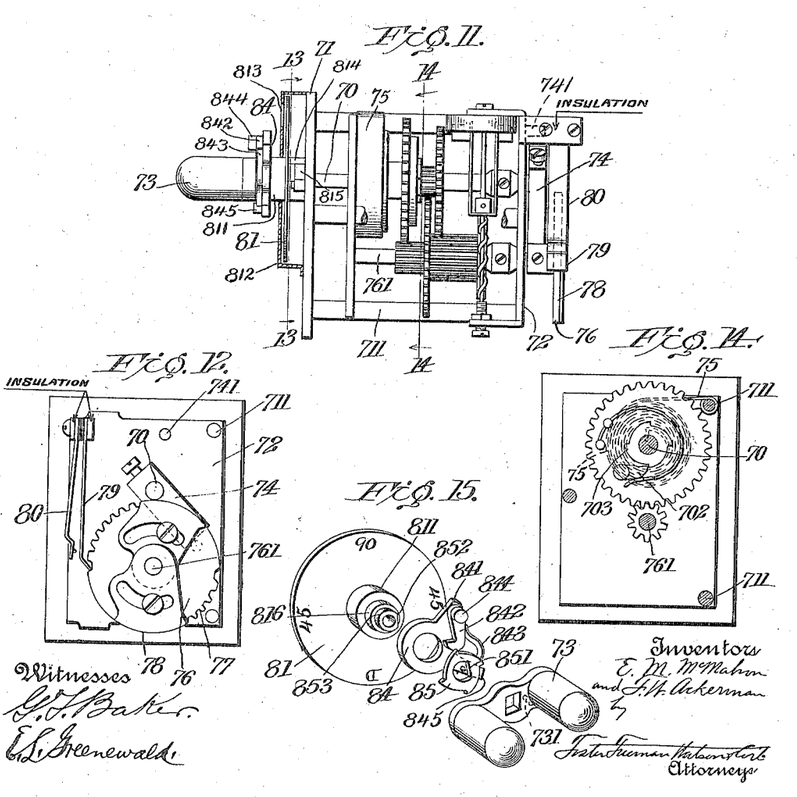
Fig. 14 is a transverse sectional view taken on the line 14—14 of Fig. 11 looking in the direction of the arrows.
Fig. 15 is a perspective view of the parts mounted on the front end of the key spindle.
Figure 13:
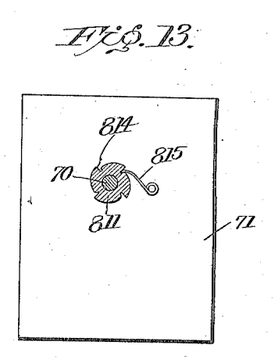
Fig. 13 is a transverse section along the line 13—13 of Fig. 11 looking in the direction of the arrows.

Referring to Fig. 15 the device for connecting the outer end of the hub 811 of the plate 81 to the spindle 70 so that the plate 81 will rotate with the key when the parts are turned by the main spring 75 consists of a double-armed plate 84 loosely mounted on the reduced portion 816 of the hub 811 and provided with a projection 841 upon which a pawl 842 is pivoted. The free end of the pawl 842 is pressed into engagement with the teeth of a ratchet 85 by the spring 843. The ratchet 85 has a flattened portion 851 which engages the flattened portion 852 of a reduced portion 853 on the hub 811 of the plate 81. The key 73 has a projection 731 which engages the lower arm 845 of the plate 84 when the key 73 is turned to wind the spring 75. This causes the plate 84 to turn with the key 73 and pushes the pawl 842 over one ratchet tooth on the plate 85 so that when the key is released and the spring 75 starts to rotate it in the reverse direction the plates 84 and 85 will rotate the plate 81 a quarter of a turn to indicate the position at which the signal is set.

Figures 5, 6, 9:
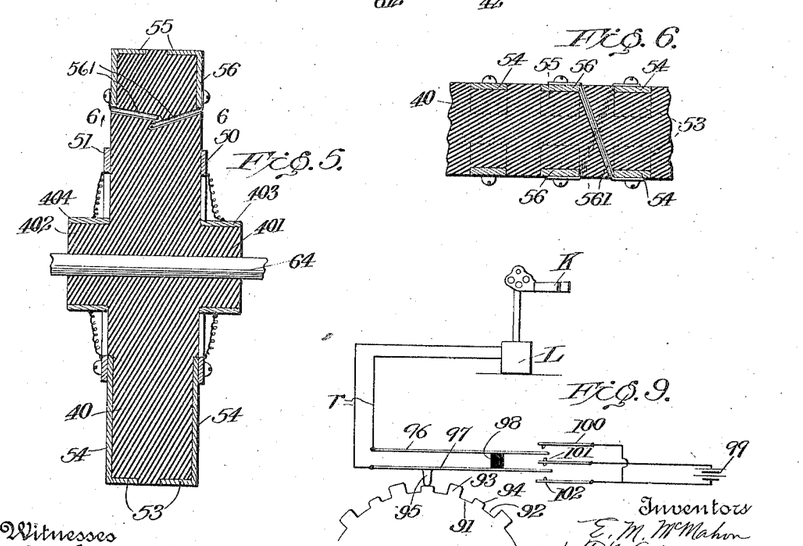
Fig. 5 is an enlarged vertical sectional view of the circuit controlling wheel.
Fig. 6 is an enlarged detail view of the same.
Fig. 9 is a detail view of a portion of another control device embodying our invention.

In Fig. 9 is illustrated a detail view of another form of make and break device for operating the signal relays. The device consists of a wheel 91 mounted and rotated intermittently in the same manner as the wheels 17 and 40. The periphery of the wheel 91 is provided with notches 92 and alternate high and low teeth 93 and 94. The notches 92 and teeth 93 and 94 form rests for the projection 95 and provide means for controlling the positions of the contact springs 96 and 97 which are fastened together by the insulating block 98. The springs 96 and 97 are connected to the circuit wires *r* which lead to the electric signal operating mechanism in the base L of the semaphore.

When the projection rests on any one of the lower teeth 94, the arm K is positively moved to and set at "danger," and the wires *r* are disconnected from the battery 99. When the projection 95 drops into any one of the notches 92 the springs 96 and 97 will make contact with the contacts 101 and 102 respectively and the current flowing through the wires *r* to the electric mechanism in the base L whereby the signal arm is moved positively to "45" position.

By stepping the wheel 91 so that the projection 95 rests on one of the teeth 93, the springs 96 and 97 make contact with the contacts 100 and 101 and the flow of current in in the circuit wires *r* is reversed causing the movement of the arm K to "90" position. Alternate positions of the projection 95 serve to set the arm K at "45" position, and the signal will always move to "danger" position when the electric mechanism in the base L is deënergized.

The operation of the arrangment will be apparent from the foregoing description and it is to be understood that the invention is not to be limited to the particular arrangement or construction of the parts as it is evident that various changes may be made in the details of the devices without departing from the spirit of the invention.

It will be obvious that the semaphores and actuating devices therefor employed in carrying out the invention may be either of the type shown in Fig. 1 or that of Fig. 1ª, or if desired signals and actuating means of both said types might be included in one installation or embodiment of the invention, one type of semaphore being at one or more way stations and the other type at others. With either form complete control from the despatcher's station is provided, and the position of every semaphore is indicated at the despatcher's station. The provision at each way station of means, such as the keys 37, 68, by which, if it is desired or becomes necessary, an attendant at such station may actuate the semaphore of that particular station, is an important addition to the system. As previously pointed out, the switch 36 or 66, is intended to be normally closed, and if any emergency causes the use of a way station key 37 or 68, the semaphore affected will be restored to its former position, shown on the indicater at the despatcher's office as soon as the necessity requiring such unusual operation has passed. It will be seen that the system is entirely complete and operative, even if said way station keys are omitted therefrom.

Having thus described our invention, what we claim is:—

1. In a train despatching system, the combination of a train despatcher's station, a plurality of way stations, an electric circuit connecting the despatcher's station with each of the way stations, means whereby the despatcher may communicate with any one of the way-stations over said circuit, a signal at each way station adapted to give more than two indications, means at the despatcher's station, including a plurality of keys, one for each way station, whereby any one of said signals may be operated directly by the despatcher by impulses sent over said circuit, to furnish any of its possible indications and a device associated with each key to indicate at the despatcher's office the condition of the corresponding way station signal.

2. In a train despatching system, the combination of a train despatcher's station, a plurality of way stations, an electric circuit connecting the despatcher's station with each of the way stations, means whereby the despatcher may communicate with any one of the way-stations over said circuit, a signal at each way station adapted to give more than two indications, means at the despatcher's station including a plurality of keys, one for each way station, whereby any one of said signals may be operated directly by the despatcher by impulses sent over said circuit, to furnish any of its possible indications, and independent means at each way station adapted to operate the signal at that station.

3. In a train despatching system, the combination of a despatcher's station, a plurality of way stations, an electric circuit connecting the despatcher's office with each of the way stations, means whereby the despatcher may communicate with any one of the way-stations over said circuit, a signal at each way station adapted to give more than two indications, and means for actuating the signals at the way stations from the despatcher's station, including an elctrically actuated step by step device, connected in said circuit and associated with each signal, said device being adapted to effect at least two changes of the signal, and devices at the despatcher's station for selecting and operating any one of said step by step devices.

4. In a train despatching system, the combination of a despatcher's station, a plurality of way stations, an electrical circuit connecting the despatcher's station with each of the way stations, means whereby the despatcher may call and communicate with any of the way stations over said circuit, a three position semaphore associated with each of the way stations, an electrically actuated device in said circuit at each way station adapted to adjust the associated semaphore into two of its positions, and means at the despatcher's office for selecting and effecting operation of any of said semaphore actuating devices.

5. In a train despatching system, the combination of a despatcher's station, a plurality of way stations, an electric circuit connecting the despatcher's station with each of the way stations, means whereby the despatcher may communicate with any one of the way-stations over said circuit, a semaphore associated with each way station and adapted to assume more than two positions, means at each way station, controlled by said circuit, for raising and lowering the associated semaphore, to any of said positions, and means at the despatcher's station for selecting and causing operation of any of the semaphore actuating means.

6. In a train despatching system, the combination of a despatcher's station, a plurality of way stations, an electric circuit connecting the despatcher's station with each of the way stations, a semaphore associated with each way station and adapted to assume more than two positions, an electrically actuated step by step device associated with each semaphore and adapted to adjust the same into two of its several positions, means at the despatcher's office for sending over said circuit impulses adapted to select and effect actuation of any of said step by step devices, and means coöperating with each of said devices for effecting movement of the semaphore independent of the devices at the despatcher's station.

7. In a train despatching system the combination of a train despatcher's station, a plurality of way stations, an electric circuit connecting the despatcher's station with each of the way stations, a three position signal associated with each way station, and comprising electric means for operating the signal, a control circuit for said electric operating means, a device for effecting three current changes in the control circuit, a magnet for operating said device, a selectable mechanism at the way station with which said magnet is connected, and means whereby the selectable mechanism at any way station may be selected from the despatcher's stations to operate the magnet and the signal associated therewith.

8. In electric signaling mechanism, the combination with a plurality of signals, of electric operating means for each signal, a source of current supply, means controlling the supply of current to each operating means and including a device capable of effecting current changes in said operating means by making, breaking and reversing the circuit including said operating means and source of current, a magnet for operating each of said devices, a circuit including all of said magnets, and a selectable mechanism in said circuit.

9. In an electric signaling mechanism, the combination with a triple indication signal, of electric means for operating the signal, a source of current supply, and means controlling the supply of current to the operating means, said controlling means comprising a device adapted to effect three changes in the flow of the current to the signal operating means to change the indication of the signal, and electric means for actuating said device, comprising means selectable and operable from a station common to a plurality of such signaling mechanism.

10. In an electric signaling mechanism, the combination of a multi-position signal, electric means for operating the signal, and means controlling the electric operating means comprising a source of current supply, an intermittently rotatable device provided with current carrying contacts electrically connected with the source of current supply, means for operating said device, and brushes arranged in circuit with the electric operating means of the signal and bearing on said rotatable device in the path of the current carrying contacts thereon.

11. In an electric signaling mechanism, the combination with a signal capable of presenting three different aspects, of electric means for operating said signal, a source of current supply and a device for controlling the current supply to actuate the operating means, said device comprising an intermittently rotatable member having parts thereon capable of electrically connecting and disconnecting the signal operating means and the source of current supply, said device being also capable of reversing the direction of the current, and a magnet for intermittently actuating said rotatable member.

12. In an electric signaling system, the combination of a control station, a plurality of three position signals, means for operating each signal comprising an electric circuit, an intermittently rotatable member, having contacts corresponding to different positions of the signal and adapted to be successively included in said circuit as the member rotates, and a magnet for operating said member, and means at the control station for selectably controlling the magnets.

13. In an electric signaling system, the combination of a three position semaphore, electric means for operating the semaphore, and a device for controlling said operating means, comprising an intermittently rotatable device having a plurality of groups of parts, the members of each group being related in a manner corresponding to the different positions of the semaphore, so that each step by step movement of the device will produce a change in the position of the semaphore, and electric means for actuating said device.

14. In an electric signaling mechanism, the combination of a three-position semaphore signal comprising "45", "90" and "danger" positions, means for operating the signal to set the same at any one of said positions, means controlling the operating means, a device for selecting the controlling means, an impulse sending mechanism to operate said selecting device, a key for controlling said mechanism, and means associated with said key for indicating at what position said signal is set.

15. In an electric signaling mechanism, the combination of a multi-indication signal, means for operating the signal, means for controlling the operating means, a device for selecting the controlling means, an impulse sending mechanism having a combination adapted to operate said selecting device, and a plate carried by a part of the impulse sending mechanism to indicate the position of the signal.

16. In an electric signaling system, the combination of a three-position semaphore signal, operating means for said signal, means for controlling said operating means, a magnet for actuating said controlling means, a device for selecting said magnet, an impulse sending device, an electric circuit connecting said impulse sending device and selecting device, and an indicating member associated with said impulse sending device and arranged so as to indicate the successive positions of the three-position signal.

17. In an electric signaling system, the combination of a control station, a plurality of multi-indication signals, a control means for each signal, means at the control station for selecting and rendering any of said control means operative, including a plurality of keys one for each signal, and a device movable by each of said keys to indicate the condition of the signals, said device remaining in each adjusted position until a subsequent operation of the key.

18. In an electric signal controlling mechansim, the combination with the terminals of a two-wire signal control circuit, of terminals adapted to be connected to a source of current, a wheel carrying a plurality of groups of rests for causing the electrical connection, disconnection and reversal of connection of said current terminals and control-circuit terminals whereby three different current conditions may be provided in said two-wire control circuit, and means for operating said wheel.

19. In an electric signal controlling mechanism, the combination of a support, a wheel comprising insulating material rotatably mounted on said support, a plurality of groups of contacts on said wheel, there being three pairs of contacts in each group and insulating rests separating the groups of contacts, conductors leading to said contacts, the intermediate pair of contacts of each group of contacts being of reversed polarity with respect to the other two pairs of contacts of the group, a pair of contact springs for engaging said contacts and insulating rests to make, break and reverse the current controlled, and means for intermittently rotating said wheel.

In testimony whereof we affix our signatures.

EDWARD M. McMAHON.
FRANK W. ACKERMAN.

Witnesses:
A. S. Dinen,
Anna K. Gustin.

Copies of this patent may be obtained for five cents each, by addressing the "Commissioner of Patents, Washington, D. C."